(12) United States Patent
Mukai et al.

(10) Patent No.: US 8,907,602 B2
(45) Date of Patent: Dec. 9, 2014

(54) CONTROL APPARATUS OF ROTATING DEVICE

(71) Applicant: Denso Corporation, Kariya, Aichi-pref. (JP)

(72) Inventors: Yasuhiko Mukai, Anjo (JP); Kiyoshi Fujii, Kasugai (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 13/959,901

(22) Filed: Aug. 6, 2013

(65) Prior Publication Data
US 2014/0035491 A1 Feb. 6, 2014

(30) Foreign Application Priority Data
Aug. 6, 2012 (JP) ................ 2012-173716

(51) Int. Cl.
*H02P 21/00* (2006.01)
*H02P 6/00* (2006.01)
*H02P 21/05* (2006.01)

(52) U.S. Cl.
CPC ............. *H02P 6/001* (2013.01); *H02P 21/05* (2013.01)
USPC .................................... 318/400.02

(58) Field of Classification Search
CPC .................................. H02P 21/0035
USPC ....................................... 318/400.02
See application file for complete search history.

(56) References Cited

U.S. PATENT DOCUMENTS

| 5,585,708 | A | * | 12/1996 | Richardson et al. .......... 318/800 |
| 8,471,504 | B2 | * | 6/2013 | Ueda et al. ............... 318/400.02 |
| 8,604,731 | B2 | * | 12/2013 | Kato et al. ............... 318/400.22 |
| 2008/0246426 | A1 | | 10/2008 | Aoki et al. |

FOREIGN PATENT DOCUMENTS

| JP | 2008-30825 | 2/2008 |
| JP | 2008-228476 | 9/2008 |

* cited by examiner

*Primary Examiner* — Erick Glass
(74) *Attorney, Agent, or Firm* — Nixon & Vanderhye PC

(57) ABSTRACT

In a control apparatus of a rotating device, a voltage command value setting section sets terminal command values on the basis of a command value of a control amount of the rotating device. Individual correcting sections calculate feedback operation amounts on the basis of history information of electric currents flowing in respective terminals of the rotating device and corrects the terminal voltage command values with the feedback operation amounts. A prohibiting section prohibits difference corresponding amounts, which correspond to differences of the feedback operation amounts and an average of the feedback operation amounts, from being reflected in correcting the terminal voltage command values with maintaining polarities when a determining section determines that it is a switching time from one of a power-running control and a regeneration control to the other.

15 Claims, 11 Drawing Sheets

| SWITCHING MODE | ON SIDE | | | IDC |
|---|---|---|---|---|
| 0 | Sun | Svn | Swn | |
| 1 | Sup | Svn | Swn | iu |
| 2 | Sup | Svp | Swn | -iw |
| 3 | Sun | Svp | Swn | iv |
| 4 | Sun | Svp | Swp | -iu |
| 5 | Sun | Svn | Swp | iw |
| 6 | Sup | Svn | Swp | -iv |
| 7 | Sup | Svp | Swp | |

CONTROL APPARATUS OF ROTATING DEVICE

CROSS REFERENCE TO RELATED APPLICATIONS

The present application is based on and claims priority to Japanese Patent Application No. 2012-173716 filed on Aug. 6, 2012, the contents of which are incorporated in their entirety herein by reference.

TECHNICAL FIELD

The present disclosure relates to a control apparatus that operates an alternating-current voltage applying section for applying alternating-current voltage to terminals of a rotating device in order to control a control amount of the rotating device.

BACKGROUND

JP-A-2008-228476 discloses a control apparatus that feedback-corrects an output voltage of an inverter as a feed forward operating amount proportional to a rotation speed of a motor on the basis of a peak value of electric current flowing in an anode-side direct current bus line of the inverter.

The inventors of the present disclosure found that, in the above-described control apparatus, a controllability of the motor is reduced when a power-running control and a regeneration control are switched.

SUMMARY

An object of the present disclosure is to provide a control apparatus that operates an alternating-current voltage applying section for applying alternating-current voltage to a terminal of a rotating device in order to control a control amount of the rotating device.

A control apparatus according to an aspect of the present disclosure includes an operating section and controls a control amount of a rotating device that includes a plurality of terminals. The operating section operates an alternating-current voltage applying section that includes a plurality of output terminals and applies alternating-current voltage from the output terminals to the respective terminals of the rotating device. The operating section includes a voltage command value setting section, a plurality of individual correcting section, a determining section, and a prohibiting section.

The voltage command value setting section receives a command value of the control amount and sets terminal voltage command values that are command values of voltages of the respective output terminals of the alternating-current voltage applying section as open-loop operation amounts of the control amount.

The individual correcting sections calculates feedback operation amounts for reducing fluctuation in amplitude of electric currents flowing in the respective terminals of the rotating device on the basis of history information of the electric currents flowing in the respective terminals of the rotating device. The individual correcting sections corrects the terminal voltage command values with the feedback operation amounts.

The determining section determines whether it is a switching time from one of a power-running control and a regeneration control to the other of the power-running control and the regeneration control.

The prohibiting section prohibits difference corresponding amounts from being reflected in correcting the terminal voltage command values with maintaining polarities of the difference corresponding amounts when the determining section determines that it is the switching time. The difference corresponding amounts corresponds to differences of the feedback operation amounts and an average of the feedback operation amounts.

The inventors of the present disclosure found that the polarities of the difference corresponding amounts in the feedback operation amounts tends to be inverted between the power-running control and the regeneration control. Thus, the feedback operation amounts based on the history information may differ from appropriate values just after switching between the power-running control and the regeneration control. In addition, signs of gains in a feedback control are inverted between the power-running control and the regeneration control. Thus, when a determination of switching from one of the power-running control and the regeneration control to the other delays, the feedback operation amounts may be calculated inappropriately, and the feedback operation amounts may differ from the appropriate values at the switching time.

In view of the foregoing, the control apparatus includes the prohibiting section. Thus, the control apparatus can restrict a situation that the feedback operations amounts differ from the appropriate value just after the determining section determines that it is the switching time.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

First Embodiment

A first embodiment, in which a control apparatus according to the present disclosure is applied to a control apparatus of a motor mounted in an in-vehicle electric power steering, will be described with reference to the drawings.

Figure 1:
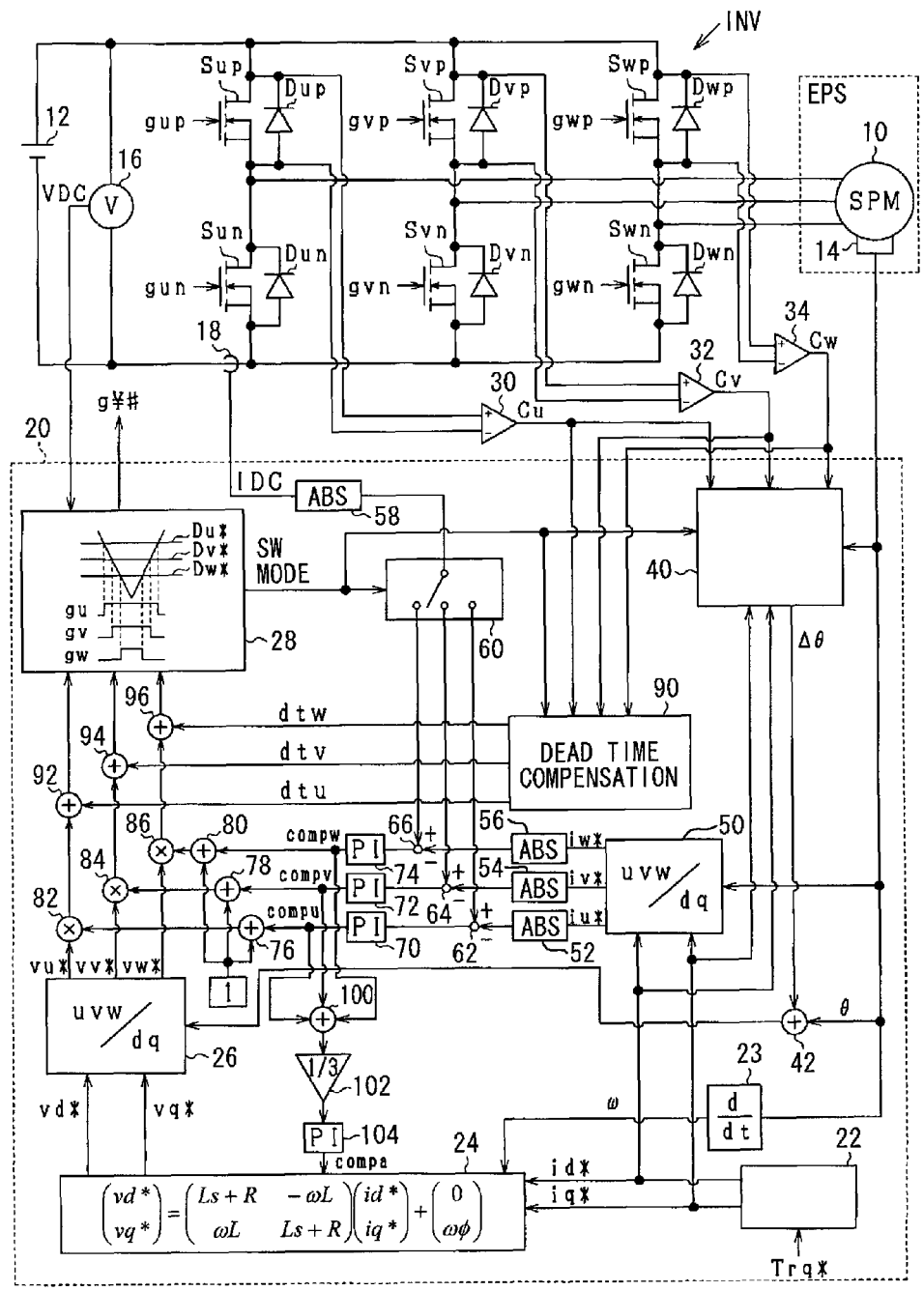
FIG. 1 is a diagram showing a motor control system according to a first embodiment of the present disclosure.

FIG. 1 is a diagram showing a configuration of a control system of a motor 10 according to the present embodiment. The motor 10 is a three-phase synchronous motor. Specifically, the motor 10 is a surface permanent magnet synchronous motor (SPMSM).

The motor 10 is coupled with a battery 12 via an inverter INV. The inverter INV includes three groups of series-coupled bodies of switching elements S¥p, S¥n (¥=u, v, w). Junction points (output terminals of the inverter INV) of the series-coupled bodies are respectively coupled to U-phase, V-phase, W-phase terminals of the motor 10. In the present embodiment, N channel metal-oxide semiconductor field-effect transistors (MOSFETs) are used as the switching elements S¥# (¥=u, v, w; #=p, n). The switching elements S¥# are respectively coupled in inverse parallel with diodes D¥#. The diodes D¥# may be body diodes of the switching elements S¥#.

In the present embodiment, the control system includes a rotation angle sensor 14, a voltage sensor 16, current sensor 18, comparators 30, 32, 34 as detection sections that detect states of the motor 10 and the inverter INV. The rotation angle sensor 14 detects a rotation angle (electrical angle θ) of the motor 10. The voltage sensor 16 detects an input voltage (power supply voltage VDC) of the inverter INV. The current sensor 18 detects electric current (bus current IDC) that flows in an input terminal of the inverter INV. In the present case, the bus current IDC flows in a negative-electrode-side input terminal coupled to a negative-electrode-side direct-current bus line Ln. The current sensor 18 may include a shunt resistor coupled in series with the negative-electrode-side direct-current bus line Ln and a device that detects potential difference between both ends of the shunt resistor.

The comparators 30, 32, 34 detect polarities of potential differences between both ends (i.e., voltages between sources and drains) of current paths of the upper arm switching elements S¥p.

Detection values of the above-described various sensors and output signals C¥ of the comparators 30, 32, 34 are transmitted to the control apparatus 20. The control apparatus 20 generates operation signals for operating the inverter INV on the basis of the detection values of the various sensors and outputs the operation signals. Signals for operating the switching elements S¥# of the inverter INV are expressed as operation signals g¥#.

Processes performed by the control apparatus 20 are shown by a block diagram. After describing an outline of control, a power-running and regeneration switching control will be described below.

[Outline of Control]

A command current setting portion 22 receives a torque command value Trq* and sets electric current that is required for controlling a torque of the motor 10 to be the torque command value Trq* as command values (current command values id*, iq*). In the present embodiment, electric currents for achieving a minimum current maximum torque control are set as the current command values id*, iq*. In other words, id*=0 and iq*≠0.

A command voltage setting portion 24 receives the current command values id*, iq* and an electrical angular velocity ω transmitted from a velocity calculation portion 23 and sets open-loop operation amounts (voltage command values vd*, vq*) for controlling electric currents flowing in the motor 10 to be the current command values id*, iq*. The command voltage setting portion 24 sets the voltage command values vd*, vq* using voltage equations expressed by the following equations (c1), (c2) that use a resistance R, an inductance L, and a reverse voltage constant ω of the motor 10.

$$vd^* = R \cdot id + L \cdot (did^*/dt) - \omega \cdot L \cdot iq^* \tag{c1}$$

$$vq^* = R \cdot iq + L \cdot (did^*/dt) + \omega \cdot L \cdot id^* + \omega \cdot \phi \tag{c2}$$

A three-phase converting portion 26 converts the voltage command values vd*, vq* to voltage command values vu*, vv*, vw* for the respective terminals of the motor 10.

An operation signal generating portion 28 generates the operation signals g¥# of the switching elements S¥#, which are based on the voltage command values vu*, vv*, vw*, on the basis of comparison of duty signals D¥# standardized by the power supply voltage VDC with triangular wave carriers. Specifically, the operation signal generating portion 28 generates upper arm operation signals g¥p by delaying rising edges of PWM signals g¥, whose logic H and logic L are determined on the basis of the comparison result, by a dead time. In addition, the operation signal generating portion 28 generates lower arm operation signals g¥n by delaying rising edges of logical inversion signals of the PWM signals g¥ by the dead time.

In the present embodiment, the above-described open-loop control is fundamental. However, in order to reduce a torque ripple of the motor 10, the following four processes are performed. A first process is a phase compensating process in which a phase of electric current flowing in the motor 10 is feedback-controlled to phases of the current command values id*, iq*. A second process is an amplitude correcting process in which fluctuation in amplitudes of electric currents flowing in the respective terminals of the motor 10 is reduced. A third process is a dead time compensating process in which a reduction of voltage controllability due to the dead times provided to the operation signals g¥p and the operation signals g¥n are compensated. A fourth process is a modeling error compensating process in which modeling errors of the above-described voltage equations are compensated. The processes will be described below.

Firstly, the phase compensating process will be described.

Figures 2, 3:
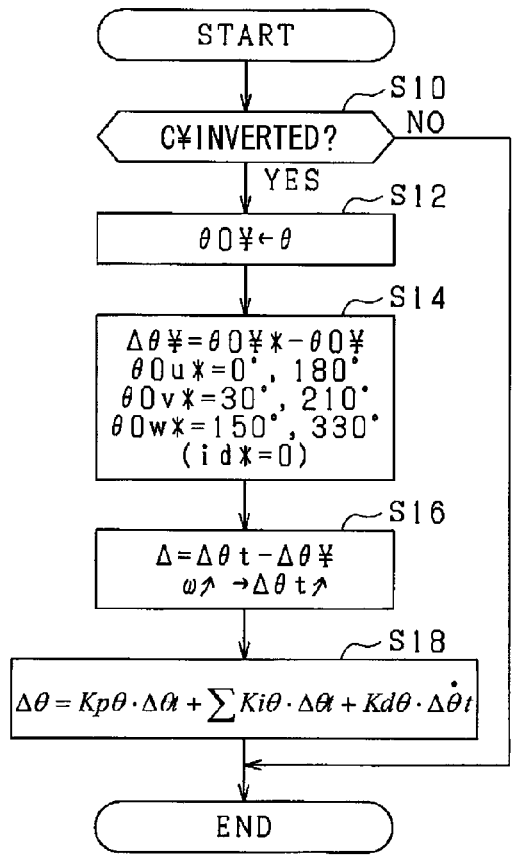
FIG. 2 is a flowchart showing a process performed by a phase correcting portion in the motor control system according to the first embodiment.
FIG. 3 is a diagram showing a relationship between a switching mode of an inverter and a bus current.

A phase operating portion 40 receives the output signals C¥ of the comparators 30, 32, 34 and calculates a correction amount Δθ that corrects electrical angle θ inputted to the three-phase converting portion 26. Details of a process performed by the phase operating portion 40 are shown in FIG. 2. The phase operating portion 4 repeats the process at a predetermined interval.

At S10, the phase operating portion 40 determines whether logic of the output signal C¥ is inverted in a period in which the switching element S¥# is in on-state. The process is performed for determining an inverting timing of a polarity of a phase current i¥ of the motor 10. In other words, when the polarity of the phase current i¥ is inverted, a polarity of a potential difference between both ends of the switching element S¥# is inverted. The phase operating portion 40 determines the period in which the switching element S¥# is in on-state on the basis of switching mode information transmitted from the operation signal generating portion 28. The switching mode expresses whether each of the switching elements S¥# included in the inverter INV is in on-state or off-state.

When the phase operating portion 40 determines that logic of the output signal C¥ is inverted (S10: YES), the phase operating portion 40 proceeds to S12 at which the phase operating portion 40 stores the electrical angle θ at the time as an inverted phase θ0¥. At S14, the phase operating portion 40 calculates a deviation Δθ¥ by subtracting the inverted phase θ0¥ stored at S12 from an inverted phase command value θ0¥*. An inverted phase command value θ0u* is 0 degrees or 180 degrees, an inverted phase command value θ0v* is 30 degrees or 210 degrees, and an inverted phase command value θ0w* is 150 degrees or 330 degrees. This is because the current command value id* of a d-axis is set to zero in the present embodiment. For example, whether the inverted phase command value θ0u* is set to 0 degrees or 180 degrees depends on the actual electrical angle θ. When the actual electrical angle θ is near 0 degrees, the inverted phase command value θ0u* is set to 0 degrees. When the actual electrical angle θ is near 180 degrees, the inverted phase command value θ0u* is set to 180 degrees. When the inverted phase command value θ0u* is zero and the inverted phase θ0u is 350 degrees or more and is less than 360 degrees, it is preferable to calculate the deviation Δθ¥ after resetting a value obtained by subtracting the inverted phase θ0u from 360 degrees as the inverted phase θ0u.

At S16, the phase operating portion 40 calculates the difference between the deviation Δθ¥ and a target value Δθt. The target value θt is a compensation amount for compensating a delay of the inverting timing stored at S12 with respect to the actual inverting timing of the polarity of the phase current i¥ when the deviation Δθ¥ is feedback-controlled to zero by a proportional integral derivative (PID) control described later. The target value Δθt increases with increase in the electrical angular velocity ω. This is because the delay amount of the inverting timing stored at S12 with respect to the actual inverting timing of the polarity of the phase current i¥ increases with increase in the electrical angular velocity ω.

At S18, the phase operating portion 40 sets the sum of outputs of a proportional element, an integral element, and a differentiating element, whose inputs are the difference Δ, as the correction amount Δθ.

When the correction amount Δθ is calculated, the phase correcting portion 42 corrects the electrical angle θ with the correction amount Δθ and transmits the corrected electrical angle to the three-phase converting portion 26. Accordingly, the three-phase converting portion 26 shifts the phases of the voltage command values v¥* by the correction amount Δθ with respect to the phases of the voltage command values vd*, vq*.

Next, the amplitude correcting process will be described.

The three-phase converting portion 50 converts the current command values id*, iq* to the three-phase current command values i¥*. An absolute value calculating portion (ABS) 52 calculates the absolute value of a current command value iu* and transmits the absolute value of the current command value iu* to a deviation calculating portion 62. An absolute value calculating portion (ABS) 54 calculates the absolute value of a current command value iv* and transmits the absolute value of the current command value iv* to a deviation calculating portion 64. An absolute value calculating portion (ABS) 56 calculates the absolute value of a current command value iw* and transmits the absolute value of the current command value iw* to a deviation calculating portion 66.

An absolute value calculating portion (ABS) 58 calculates the absolute value of the bus current IDC and transmits the absolute value of the bus current IDC to a selector 60. The selector 60 selectively transmits the absolute value of the bus current IDC to one of the deviation calculating portions 62, 64, 66 on the basis of the switching mode information transmitted from the operation signal generating portion 28 to the selector 60. The selector 60 stores relationships shown in FIG. 3. The selector 60 figures out which one of the absolute values of the phase currents iu, iv, iw is equal to the absolute value of the bus current IDC and transmits the output value of the absolute value calculating portion 38 to one of the deviation calculating portion 62, 64, 66 corresponding to the phase whose current is equal to the absolute value of the bus current IDC. In FIG. 3, a sign of the phase current i¥ is set to plus in a case where the phase current i¥ is transmitted from the inverter INV toward the motor 10. In the present embodiment, the selector 60 can operate as an identification section.

An individual feedback operation amount control portion 70 shown in FIG. 1 receives an output signal from the deviation calculating portion 62 and calculates an operation amount for feedback-controlling the absolute value of the phase current iu of the U-phase to the absolute value of the current command value iu*. An individual feedback operation amount control portion 72 receives an output signal from the deviation calculating portion 64 and calculates an operation amount for feedback-controlling the absolute value of the phase current iv of the V-phase to the absolute value of the current command value iv*. An individual feedback operation amount control portion 74 receives an output signal from the deviation calculating portion 66 and calculates an operation amount for feedback-controlling the absolute value of the phase current iw of the W-phase to the absolute value of the current command value iw*. In the present embodiment, each of the individual feedback operation amount calculating portions 70, 72, 74 calculates operation amounts (i.e., individual correction amounts comp¥) as the sum of outputs of a proportional element and an integral element, whose inputs are the output signal of corresponding one of the deviation calculating portions 62, 64, 66.

Time constants of the individual feedback operation amount calculating portions 70, 72, 74 are set such that responses of the feedback control by the individual feedback operation amount calculating portions 70, 72, 74 are lower than response of the phase compensating process by the phase operating portion 40. This is because when the phases of the current command values i¥* differ from the phase of the actual phase current i¥, output values (i.e., the individual correction amounts comp¥) of the individual feedback operation amount calculating portions 70, 72, 74 may differ from appropriate values for feedback-controlling the amplitudes of the phase currents i¥ to the amplitudes of the current command values i¥*.

An adding portion 76 adds 1 to the individual correction amount compu transmitted from the individual feedback operation amount calculating portion 70 and outputs a calculation result to a multiplying portion 82. Similarly, an adding portion 78 adds 1 to the individual correction amount compv transmitted from the individual feedback operation amount calculating portion 72 and outputs a calculation result to a multiplying portion 84. An adding portion 80 adds 1 to the individual correction amount compw of the individual feedback operation amount calculating portion 74 and outputs a calculation result to a multiplying portion 86. The multiplying portions 82, 84, 86 respectively multiply the voltage command values vu*, vv*, vw* by the output signals of the adding portions 76, 78, 80 and output calculation results as the voltage command values vu*, vv*, vw* corrected with feedback operation amounts.

In the present embodiment, cooperation of the individual feedback operation amount calculating portions 70, 72, 74, the adding portions 76, 78, 80, and the multiplying portions 82, 84, 86 enables the amplitude corrections of the voltage command values v¥*. The phase currents i¥ are alternating-currents. Thus, when amplitude correction amounts are quantified with the ratios of the output value of the absolute value calculating portion 58 and the output values of each of the absolute value calculating portions 52, 54, 56, denominators may be zero or may approach zero in calculation of the ratios, and calculation accuracy of the amplitude correction amounts may be reduced. The calculations of the ratios can be avoided when the denominators are small. However, in this case, a control may be complicated.

Next, a dead time compensating process will be described.

A dead time compensating portion 90 calculates correction amounts dt¥ of the voltage command values v¥* for the dead time compensation on the basis of the output signals C¥ of the comparators 30, 32, 34 and the switching mode information transmitted from the operation signal generating portion 28 to the dead time compensating portion 90. The output signals C¥ and the switching mode information are inputs for determining the polarities of the phase currents i¥. For example, when one of the output signals C¥ is logic H in a period in which the corresponding switching element S¥p is determined to be on-state on the basis of the switching mode information, it can be determined that the corresponding phase current i¥ is negative.

When the phase currents i¥ are determined to be negative, it is equivalent to a case where the upper arm switching elements S¥p are on-state in the dead time period. Thus, the dead time correction amounts dt¥ are set to negative correction amounts. When the phase currents i¥ are determined to be positive, it is equivalent to a case where the lower arm switching elements S¥p are on-state in the dead time period. Thus, the dead time correction amounts dt¥ are set to positive correction amounts.

The dead time correction amounts dt¥ output from the dead time compensating portion 90 are added to the output values of the multiplying portions 82, 84, 86 at correcting portions 92, 94, 96, and output values of the correcting portions 92, 94, 96 are transmitted to the operation signal generating portion 28 as final voltage command values v¥*.

Next, a modeling error compensating process will be described.

The output values of the individual feedback operation amount calculating portions 70, 72, 74 are summed at an adding portion 100 and are multiplied by ⅓ at an average calculating portion 102. An output value of the average calculating portion 102 is an average of the output values of the individual feedback operation amount calculating portions 70, 72, 74. An average feedback operation amount calculating portion 104 calculates an average correction amount compa as the sum of outputs of a proportional element and an integral element whose inputs are the output value of the average calculating portion 102. The average correction amount compa is used for correcting the resistance R in the voltage equations.

The resistance R is chosen as a compensation object of a modeling error because the resistance R changes greatly with temperature. An environment of the vehicle can be ultra low temperature (less than or equal to minus 10 degrees centigrade) or a temperature of the motor 10 can exceed 100 degrees centigrade. Thus, the maximum possible value of the resistance R may be a few times larger than the minimum possible value. In the present embodiment, it is assumed that change in inductance can be ignored because it is assumed that the motor 10 is used in a region where magnetic saturation does not occur, that is, a region where a proportionality coefficient between electric current and magnetic flux hardly changes.

In the present embodiment, the average calculating portion 102 and the average feedback operation amount calculating portion 104 can operate as a common correcting section.

[Power Running and Regeneration Switching Control]

Figure 4:
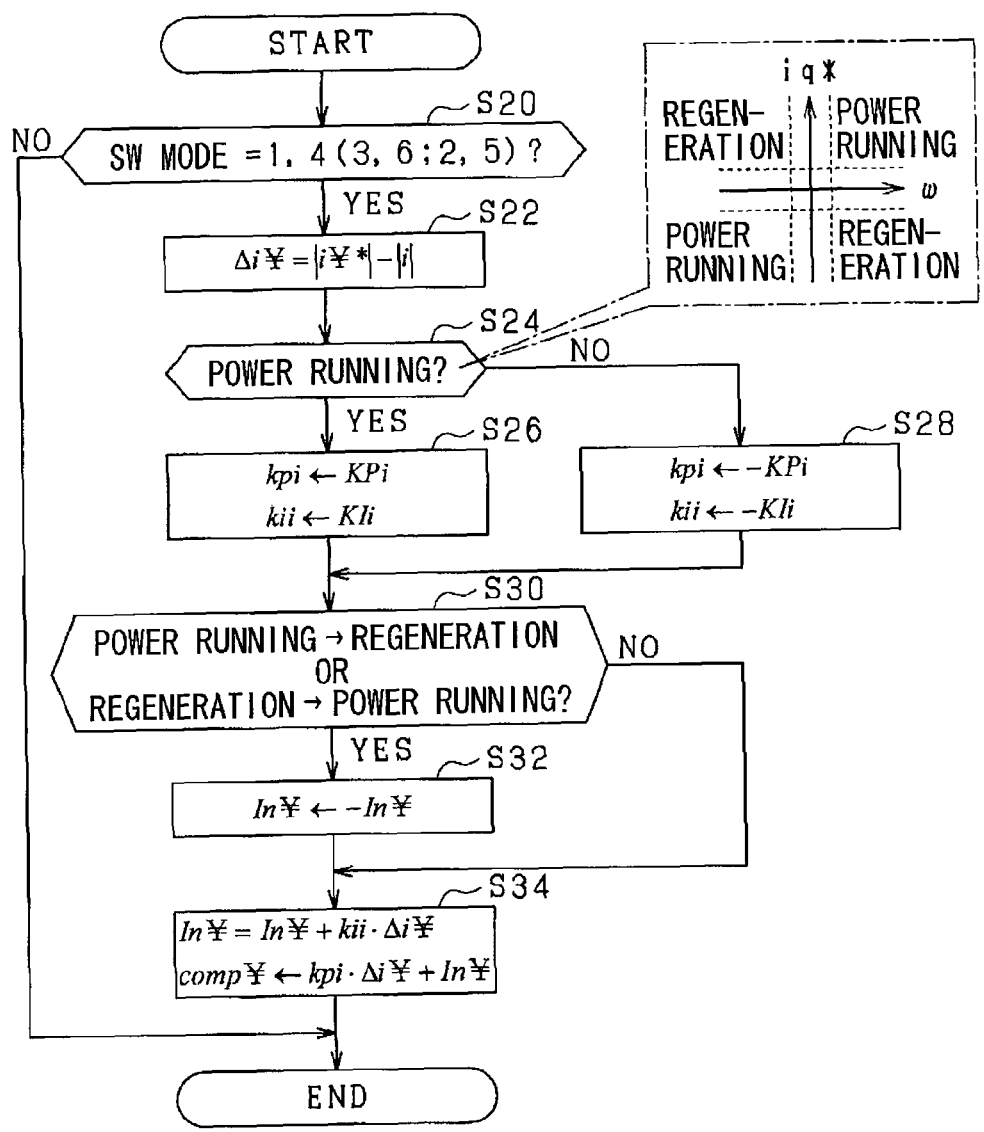
FIG. 4 is a flowchart showing an individual correcting process according to the first embodiment.

A process performed by the individual feedback operation amount calculating portions 70, 72, 74 will be described with reference to FIG. 4. Each of the individual feedback operation amount calculating portions 70, 72, 74 repeats the process at a predetermined interval. In the following description, the process performed by each of the individual feedback operation amount calculating portions 70, 72, 74 is generalized, and each of the individual feedback operation amount calculating portions 70, 72, 74 is simply referred to as an individual feedback operation amount calculating portion.

At S20, the individual feedback operation amount calculating portion determines whether the absolute value of the bus current IDC is equal to the absolute value of the phase current of the corresponding phase. When the individual feedback operation amount calculating portion 70 performs the process at S20, the individual feedback operation amount calculating portion 70 determines whether the switching mode is 1 or 4. When the determination at S20 is affirmative, a process of corresponding one of the deviation calculating portions 62, 64, 66 is performed.

At S24, the individual feedback operation amount calculating portion determines whether a power-running control is performed on the basis of the current command value iq* of the q-axis and the electrical angular velocity ω. When iq*·ω>0, the individual feedback operation amount calculating portion determines that the power-running control is performed. When iq*·ω<0, the individual feedback operation amount calculating portion determines that the regeneration control is performed. In the present embodiment in order to restrict hunting of the determination of whether the power running control or the regeneration control is performed, hysteresis is set for a condition at a time when the determination of the power-running control is switched to the determination of the regeneration control and a condition at a time when the determination of the regeneration control is switched to the determination of the power-running control. Specifically, when the individual feedback operation amount calculating portion has determined that the power-running control is performed, the individual feedback operation amount calculating portion determines that the regeneration control is performed on condition that iq*·ω becomes negative and the absolute value of iq*·ω becomes equal to or greater than a predetermined value. When the individual feedback operation amount calculating portion has determined that the regeneration control is performed, the individual feedback operation amount calculating portion determines that the power-running control is performed on condition that iq*·ω becomes positive and the absolute value of iq*·ω becomes equal to or greater than a predetermined value.

When the individual feedback operation amount calculating portion determines at S24 that the power-running control is performed, the individual feedback operation amount calculating portion proceeds to S26 to set a gain kpi of the proportional element to a proportional gain KPi and to set a gain kii of the integral element to an integral gain Kli. On the other hand, when the individual feedback operation amount calculating portion determines at S24 that the regeneration control is performed, the individual feedback operation amount calculating portion proceeds to S28 to set the gain kpi of the proportional element to −KPi and to set the gain kii of the integral element to −Kli. In this way, the polarity of the gains of the proportional element and the integral element are inverted between the power-running control and the regeneration control because an amplitude of voltage needs to be increased to increase the absolute value of electric current in the power-running control, and the amplitude of the voltage needs to be decreased to increase the absolute value of electric current in the regeneration control.

After the process at S26 or S28, the individual feedback operation amount calculating portion proceeds to S30 to determine whether it is a switching time from the power-running control to the regeneration control or a switching time from the regeneration control to the power-running control. When the individual feedback operation amount calculating portion determines that it is the switching time, the individual feedback operation amount calculating portion proceeds to S32 to invert the polarity of the output value In¥ of the integral element. This is because a sign of an appropriate value of the output value In¥ of the integral element tends to be inverted between the power-running control and the regeneration control. It is considered that the output value In¥ of the integral element arises from, for example, a voltage drop in the electric path of each phase of the inverter INV and the motor 10 because the average of the outputs (individual correction amounts comp¥) of the individual feedback operation amount calculating portions 70, 72, 74 is set to zero by the process at the average feedback operation amount calculating portion 104. Thus, the modeling error of the command voltage setting portion 24 is compensated, and it is considered that the difference between the electric current i¥ and the current command value i¥* arises from voltage drop in the electric path of each phase. It is considered that the above-described tendency arises from a fact that the polarity of the voltage drop in the electrical path is inverted between the power-running control and the regeneration control.

The process at S32 is a feed forward method for reducing fluctuation in amplitude of each of the phase currents iu, iv, iw. Accordingly, even when the appropriate value of the output value In¥ of the integral element greatly changes with switching from one of the power-running control and the regeneration control to the other, a time required for the output value In¥ to converge on the new appropriate value can be reduced. Because the process at S24 has the hysteresis, the state has already changed from the one of the power-running control and the regeneration control to the other before affirmative determination at S30. Accordingly, a time in which the polarities of the gains of the proportional element and the integral element are not appropriate is generated. Thus, in a case where the process at S32 is not performed, the time required for the output value In¥ of the integral element to converge on the appropriate value is likely to be prolonged. The process at S32 may be operated by an inversion reflecting section included in a prohibiting section.

When the process at S32 ends or when the determination at S30 is negative, the individual feedback operation amount calculating portion proceeds to S34. At S34, the individual feedback operation amount calculating portion renews the output value In¥ of the integral element into the sum of the output value In¥ and kii·∆i¥ and calculates the individual correction amount comp¥ as the sum of the output value In¥ of the integral element and the output value kpi·∆i¥.

When the process at S34 ends or when the determination at S20 is negative, the individual feedback operation amount calculating portion once ends the series of the processes.

Figure 5:
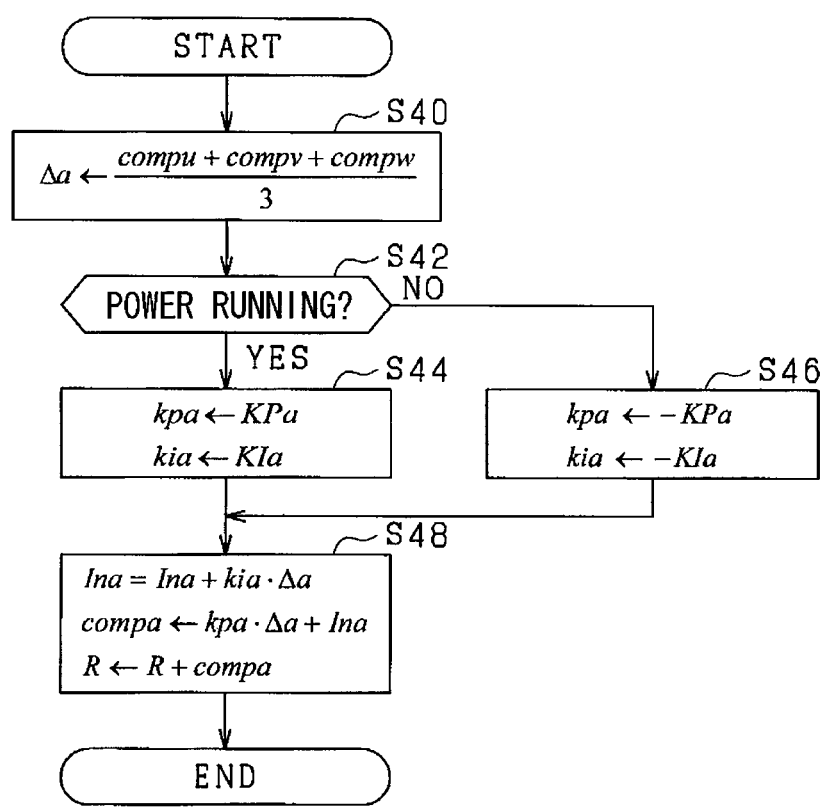
FIG. 5 is a flowchart showing a common correcting process according to the first embodiment.

Details of a process performed by the average feedback operation amount calculating portion 104 is shown in FIG. 5.

The average feedback operation amount calculating portion repeats the process at a predetermined interval.

At S40, the average feedback operation amount calculating portion 104 calculates an average ∆a of the individual correction amounts compu, compv, compw. At S42, the average feedback operation amount calculating portion 104 determines whether the power-running control is performed. When the average feedback operation amount calculating portion 104 determines at S42 that the power-running control is performed, the average feedback operation amount calculating portion 104 proceeds to S44 to set the gain of the proportional element to the proportional gain Kpa and to set the gain kia of the integral element to the integral gain Kla. When the average feedback operation amount calculating portion 104 determines at S42 that the regeneration control is performed, the average feedback operation amount calculating portion 104 proceeds to S46 to set the gain of the proportional element to −Kpa and to set the gain kia of the integral element to −Kla.

When the process at S44 or S46 ends, the average feedback operation amount calculating portion 104 proceeds to S48. At S48, the average feedback operation amount calculating portion 104 sets the output value Ina of the integral element to the sum of a preceding value and Kia·∆a, and calculates the average correction amount compa as the sum of the output value Ina of the integral element and the output value Kpa·∆a of the proportional element. Then, the average feedback operation amount calculating portion 104 corrects the resistance R by adding the average correction amount compa to the resistance R.

When the process at S48 ends, the average feedback operation amount calculating portion 104 once ends the series of the processes. In a case where the average correction amount compa is the appropriate value, because the average of the output values Inu, Inv, Inw processed at S32 is about zero, it can be considered that there is no need to invert the sign of the gain between the power-running control and the regeneration control at S44 and S46. On the other hand, it can be considered that the sign of the average correction amount compa is inverted due to the process at S32 before the average correction amount compa becomes the appropriate value. The processes from S42 to S46 are provided as a tentative plan for reducing the above-described influence.

Figure 6A:
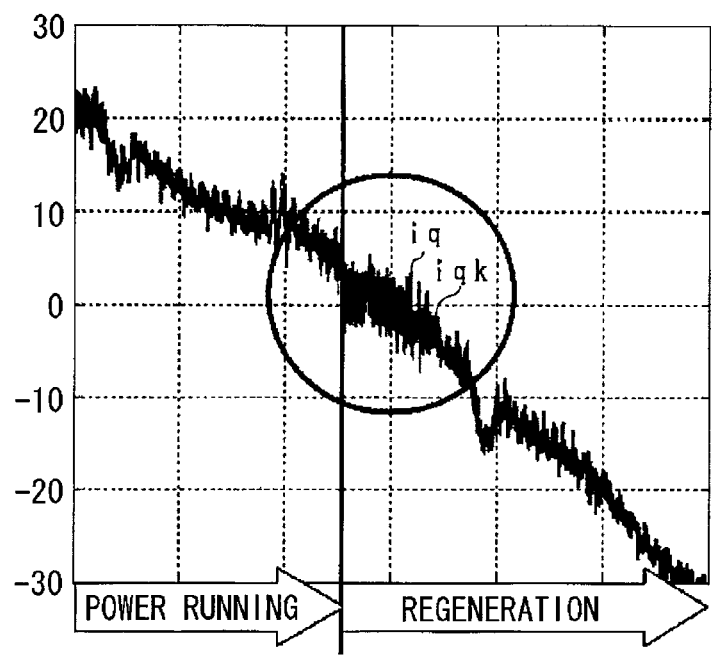
FIG. 6A is a diagram showing fluctuation in electric current at a switching time according to the first embodiment and FIG. 6B is a diagram showing fluctuation in electric current at a switching time according to a comparative example.
Figure 6B:
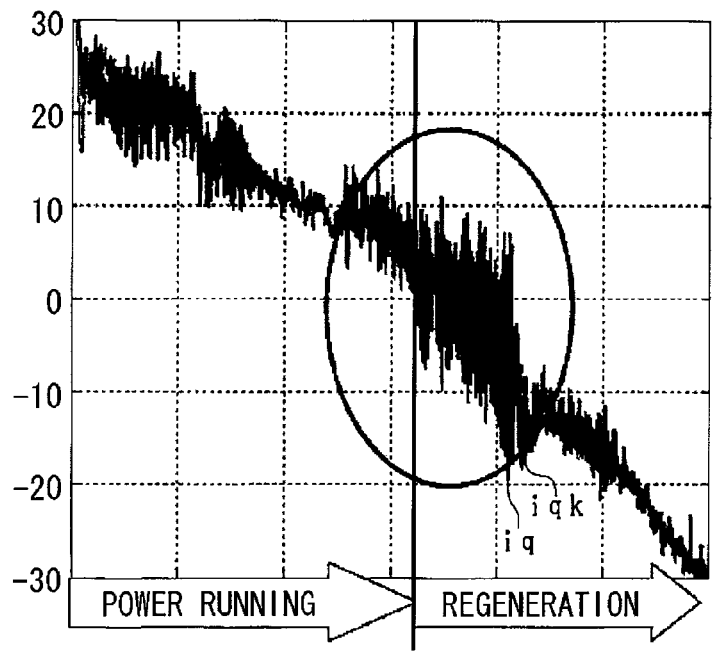

FIG. 6A is a diagram showing fluctuation in electric current in the control system according to the present embodiment, and FIG. 6B is a diagram showing a change in electric current in a control system according to a comparative example in which the correction process of the resistance R with the average correction amount compa and the process at S32 are not performed. As shown in FIG. 6A and FIG. 6B, the control apparatus 20 according to the present embodiment can restrict fluctuation in electric current at switching time from the power-running control to the regeneration control.

The control apparatus 20 according to the present embodiment can achieve the following effects.

At the switching time from of the power-running control and the regeneration control to the other, the signs of the feedback operation amounts (i.e., the output values In¥) for reducing fluctuation in the amplitude on the basis of history information of electric currents are inverted. Accordingly, in view of a tendency that the polarities of the appropriate values of the output values In¥ change between the power-running control and the regeneration control, the output values In¥ can be provided in a feed forward manner at the switching time.

The average of the individual correction amounts comp¥ is feedback-controlled to zero. Accordingly, the tendency that the signs of the appropriate values of the output value In¥ are inverted between the power-running control and the regeneration control can be actualized.

The resistance R is corrected with the average correction amount compa. Accordingly, the parameter that is the most remarkable factor of the modeling error of the command voltage setting portion 24 can be corrected.

The correction amount of the resistance R is an operation amount for feedback-controlling the average of the individual correction amounts compɎ of the all phases to zero. Because an imbalance of temperature occurs among phases and the resistance is not corrected on the basis of a specific phase, the resistance R can be appropriate for controlling the all phases. In addition, because the individual correction amounts compɎ of the all phases are averaged, the tendency that the signs of the appropriate values of the output values InɎ are inverted between the power-running control and the regeneration control can be particularly noticeable.

The hysteresis is set between the condition for determining the switching time from the power-running control to the regeneration control and the condition for determining the switching time from the regeneration control to the power running control. Because a time at which it is determined that the switching occurs is delayed with respect to an actual switching time, the individual correction values compɎ at the switching time are likely to greatly differ from the appropriate values. Thus, the process of inverting the signs of the individual correction values compɎ are particularly variable.

The control apparatus 20 receives only the bus current IDC detected by the current sensor 18 as the detection value of the electric current that flows in the motor 10. In the present case, because it is difficult to perform the known current feedback control, a motivation to use the command value of the output voltage of the inverter INV as the open-loop operation amount strengthens. In the present case, the amplitudes of the electric currents flowing in the respective phases of the motor 10 are likely to fluctuate. Thus, using the individual correction amounts compɎ and inverting the signs of the output values InɎ at switching timing between the power-running control and the regeneration control are particularly effective.

Second Embodiment

A second embodiment of the present disclosure will be described with a focus on differences from the first embodiment.

Figure 7:
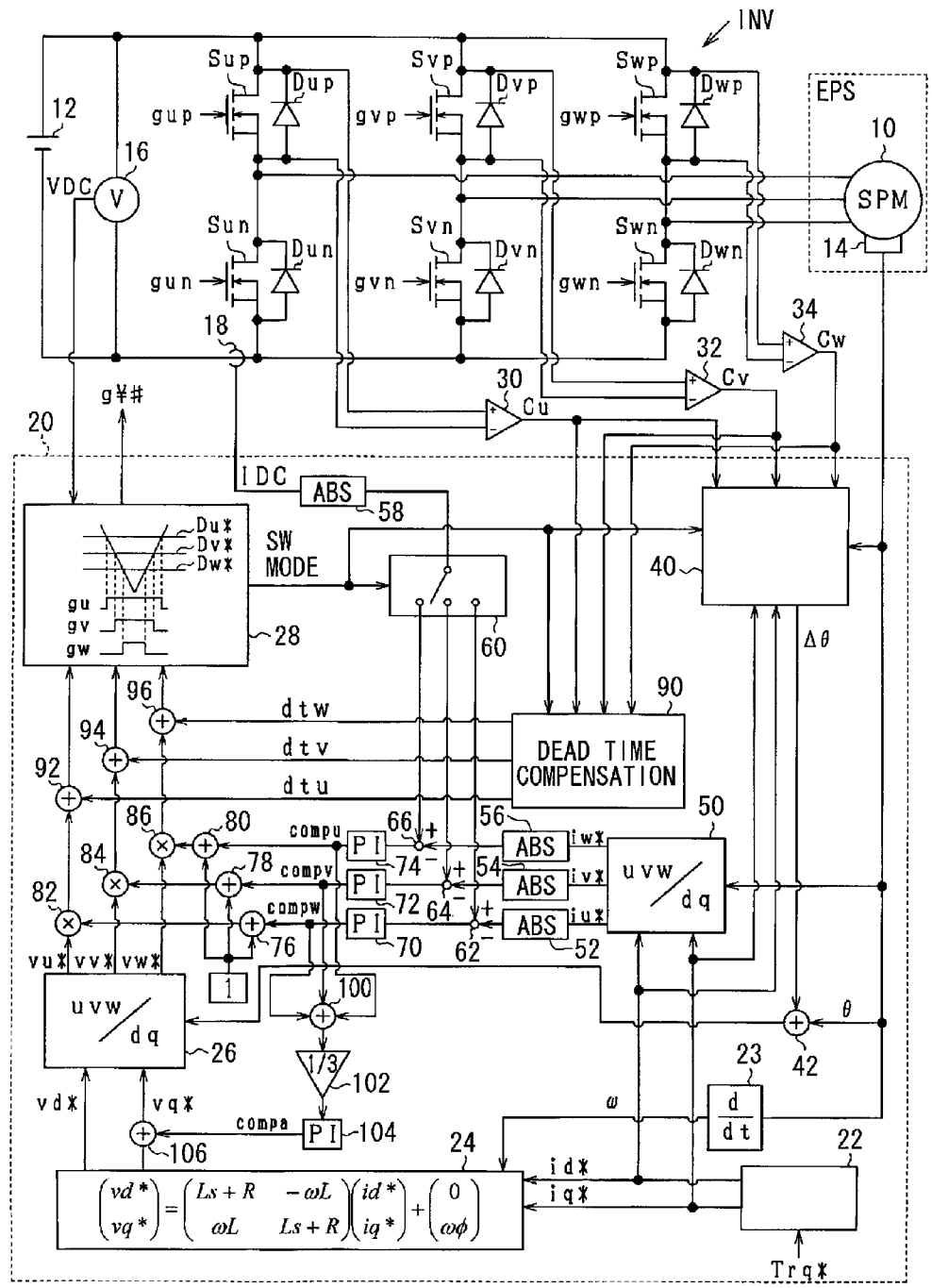
FIG. 7 is a diagram showing a motor control system according to a second embodiment of the present disclosure.

A system configuration according to the present embodiment is shown in FIG. 7. In FIG. 7, the parts and the processes shown in FIG. 1 are denoted by the same reference numerals or letters for the sake of convenience.

In the present embodiment, the voltage command value vq* of the q-axis is corrected with the average correction amount compa. In other words, the adding portion 106 adds the average correction amount compa transmitted from the average feedback operation amount calculation portion 104 to the voltage command value vq* of the q-axis transmitted from the command voltage setting portion 24 and transmits to the three-phase converting portion 26.

Only the voltage command value vq* of the q-axis is set to a correction object so as to perform a compensation process of the modeling error equivalent to the first embodiment. In other words, in the present embodiment, because the current command value id* of the d-axis is set to zero, an error of the resistance R influence only the voltage command value vq* of the q-axis.

Third Embodiment

A third embodiment of the present disclosure will be described with a focus on differences from the first embodiment.

Figure 8:
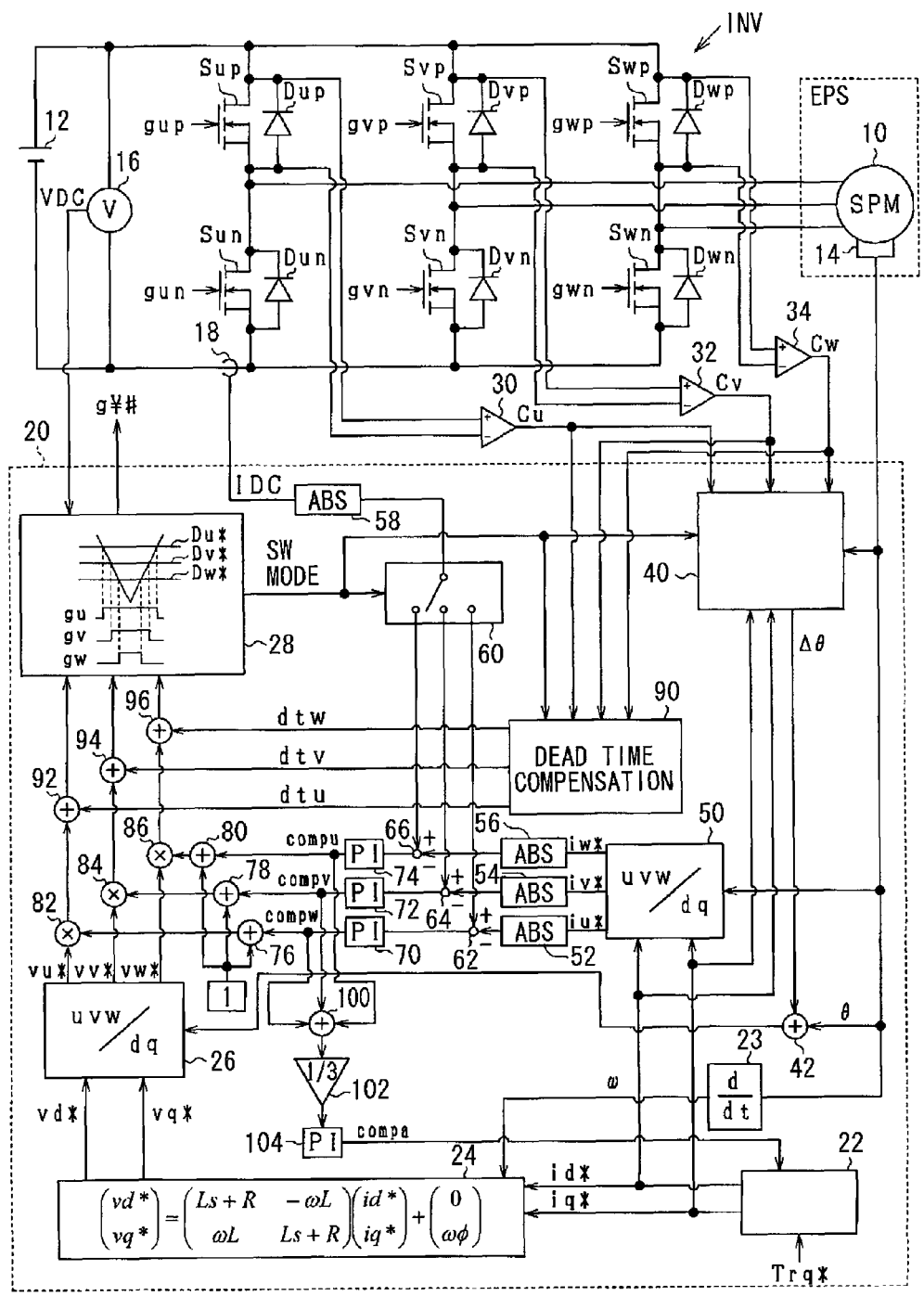
FIG. 8 is a diagram showing a motor control system according to a third embodiment of the present disclosure.

A system configuration according to the present embodiment is shown in FIG. 8. The parts and the processes shown in FIG. 1 are denoted by the same reference numerals or letters for the sake of convenience.

In the present embodiment, the command current setting portion 22 sets the current command values iq*, id* on the basis of the average correction amount compa. The command current setting portion 22 sets the current command values iq*, id* by adding a correction amount to a base value of electric current for achieving the minimum current maximum torque control so as to be equivalent to the resistance R corrected on the basis of the average correction amount compa.

Fourth Embodiment

A fourth embodiment of the present disclosure will be described with a focus on differences from the first embodiment.

In the present embodiment, the average feedback operation amount calculating portion 104 is not provided, and the resistance R is not corrected. The process performed by the individual feedback operation amount calculating portions 70, 72, 74 are changed as shown in FIG. 9.

The individual feedback operation amount calculating portions 70, 72, 74 repeats the process at a predetermined interval. In FIG. 9, a process corresponding to the process shown in FIG. 4 is denoted by the same numeral.

Figure 9:
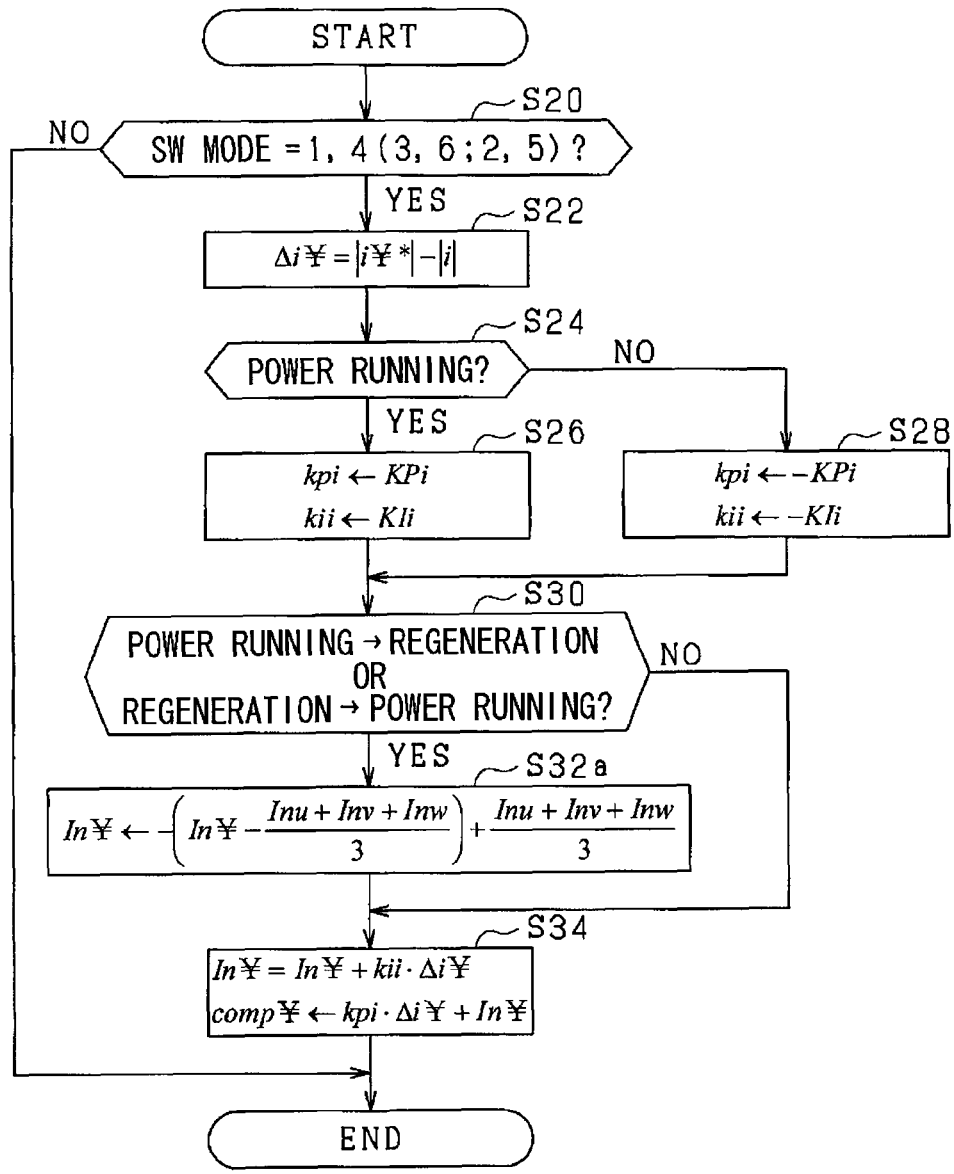
FIG. 9 is a flowchart showing an individual correcting process according to a fourth embodiment of the present disclosure.

As shown in FIG. 9, in the present embodiment, at S32a, the output value InɎ of the integral element in the last control period is set to the sum of a sign-inverted value of the difference when the average of the output values of the integral elements of the all phases in the last control period is subtracted from the output values InɎ (difference corresponding amount) and the average. In the present embodiment, the average feedback operation amount calculating portion 104 is not provided. Thus, the output value InɎ of the integral element includes a compensation amount for compensating a difference from the average of the amplitude of electric current of each of the phases and a compensation amount for setting the average to the current command value iɎ*. Thus, firstly, the difference corresponding amount is extracted from the output value InɎ. Then, by inverting the sign of the difference corresponding amount, the process equivalent to the process at S32 in FIG. 4 is performed. The average of the output values of the integral elements of the all phases is the amount corresponding to the output value of the average feedback operation amount calculating portion 104.

In the present embodiment, the process at S32a may be performed by a separating section that includes an average calculating section and a difference corresponding amount calculating section, and an inversion reflecting section included in a prohibiting section.

Fifth Embodiment

A fifth embodiment of the present disclosure will be described with a focus on differences from the first embodiment.

Figure 10:
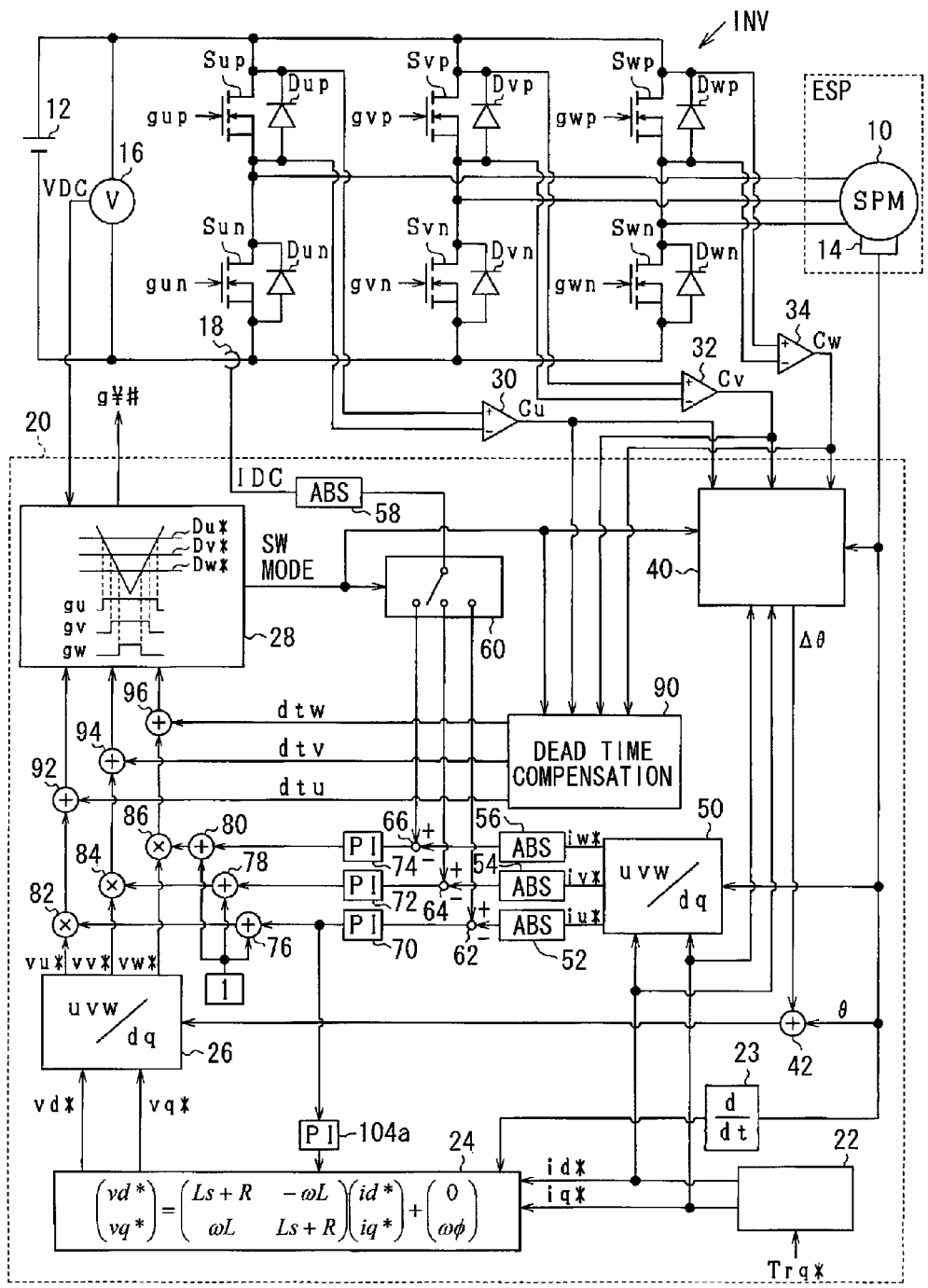
FIG. 10 is a diagram showing a motor control system according to a fifth embodiment of the present disclosure.

A system configuration according to the present embodiment is shown in FIG. 10. In FIG. 10, the parts and the processes shown in FIG. 1 are denoted by the same reference numerals or letters for the sake of convenience.

In the present embodiment, a modeling error feedback operation amount calculating portion 104a receives only the output value of one of the individual feedback operation amount calculating portions 70, 72, 74 (the individual feedback operation amount calculating portion 70 is illustrated as an example in FIG. 10). In the present case, the resistance R is corrected to an appropriate value for setting the electric current iu of the U-phase to the current command value iu*. Then, the individual feedback operation amount calculating portion 72 calculates a correction amount for compensating a difference between the amplitude of the electric current iv of the V-phase and the amplitude of the electric current iu of the U-phase. In addition, the individual feedback operation amount calculating portion 74 calculates a correction amount for compensating a difference between the amplitude of the electric current iw of the W-phase and the amplitude of the electric current iu of the U-phase.

The above-described processes can reduce the average of the individual correction amounts comp¥ calculated by the individual feedback operation amount calculating portions 70, 72, 74. Thus, even when the output values In¥ are inverted by the process at S34 in FIG. 4, the control apparatus 20 can restrict the operation amount for setting the average of the electric currents i¥ of the respective phases to the command value from being improperly inverted.

Sixth Embodiment

A sixth embodiment of the present disclosure will be described with a focus on differences from the first embodiment.

Figure 11:
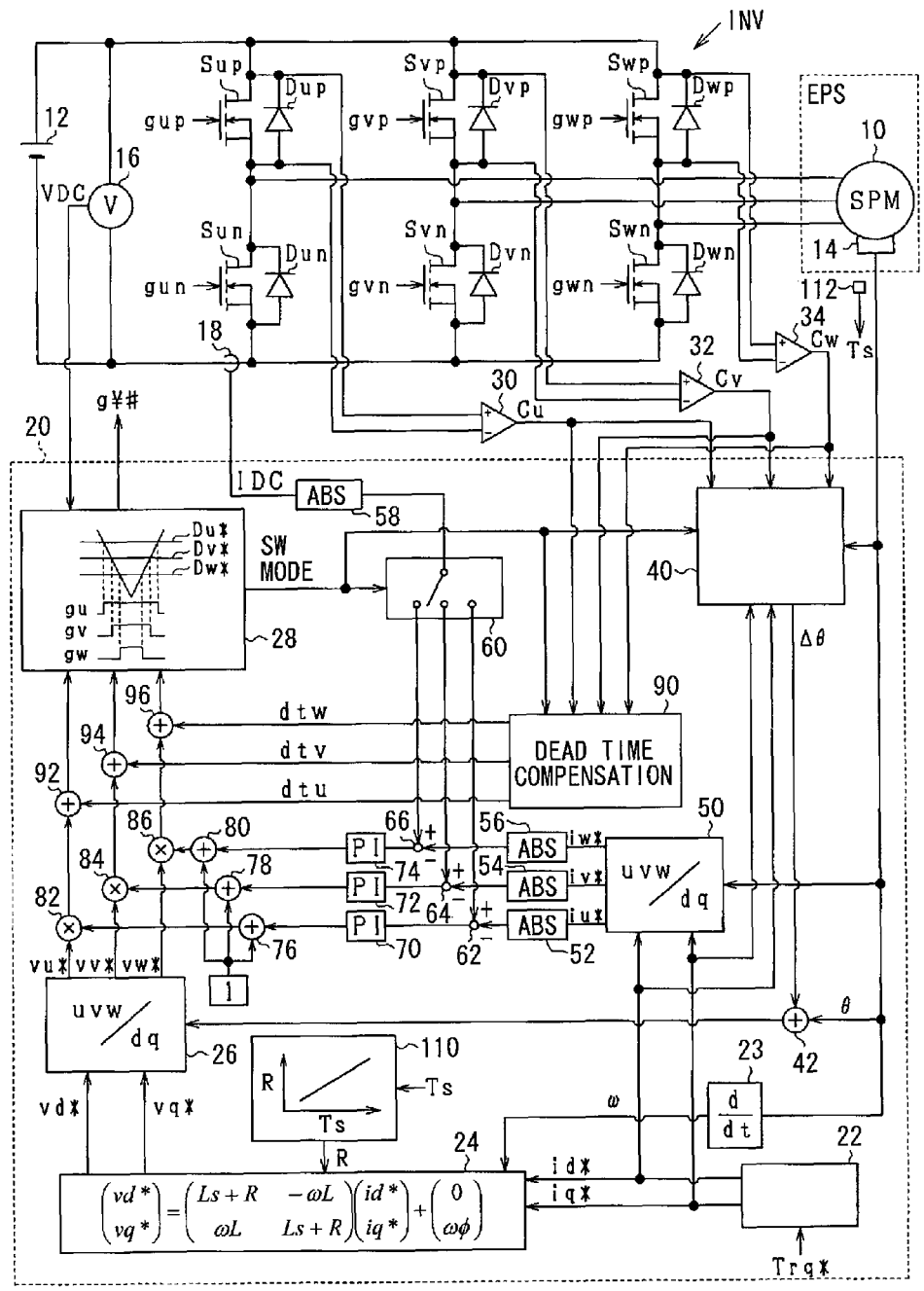
FIG. 11 is a diagram showing a motor control system according to a sixth embodiment of the present disclosure.

A system configuration according to the present embodiment is shown in FIG. 11. In FIG. 11, the parts and the processes shown in FIG. 1 are denoted by the same reference numerals or letters for the sake of convenience.

As shown in FIG. 11, in the present embodiment, a resistance correcting portion 110 receives a signal in accordance with temperature (temperature Ts of a stator winding) detected by a temperature sensor 112 and calculates the resistance R. The resistance correcting portion 110 increases the resistance R with increase in the temperature Ts. The calculated resistance R is used at the command voltage setting portion 24. Accordingly, the modeling error of the command voltage setting portion 24 can be reduced, and the average of the individual correction amounts comp¥ calculated by the individual feedback correction amount calculating portions 70, 72, 74 can be reduced. Thus, even when the output values In¥ are inverted by the process at S34 in FIG. 4, the control apparatus 20 can restrict the operation amount for setting the average of the electric currents i¥ of the respective phases to the command value from being improperly inverted.

Seventh Embodiment

A seventh embodiment of the present disclosure will be described with a focus on differences from the fourth embodiment.

Figure 12:
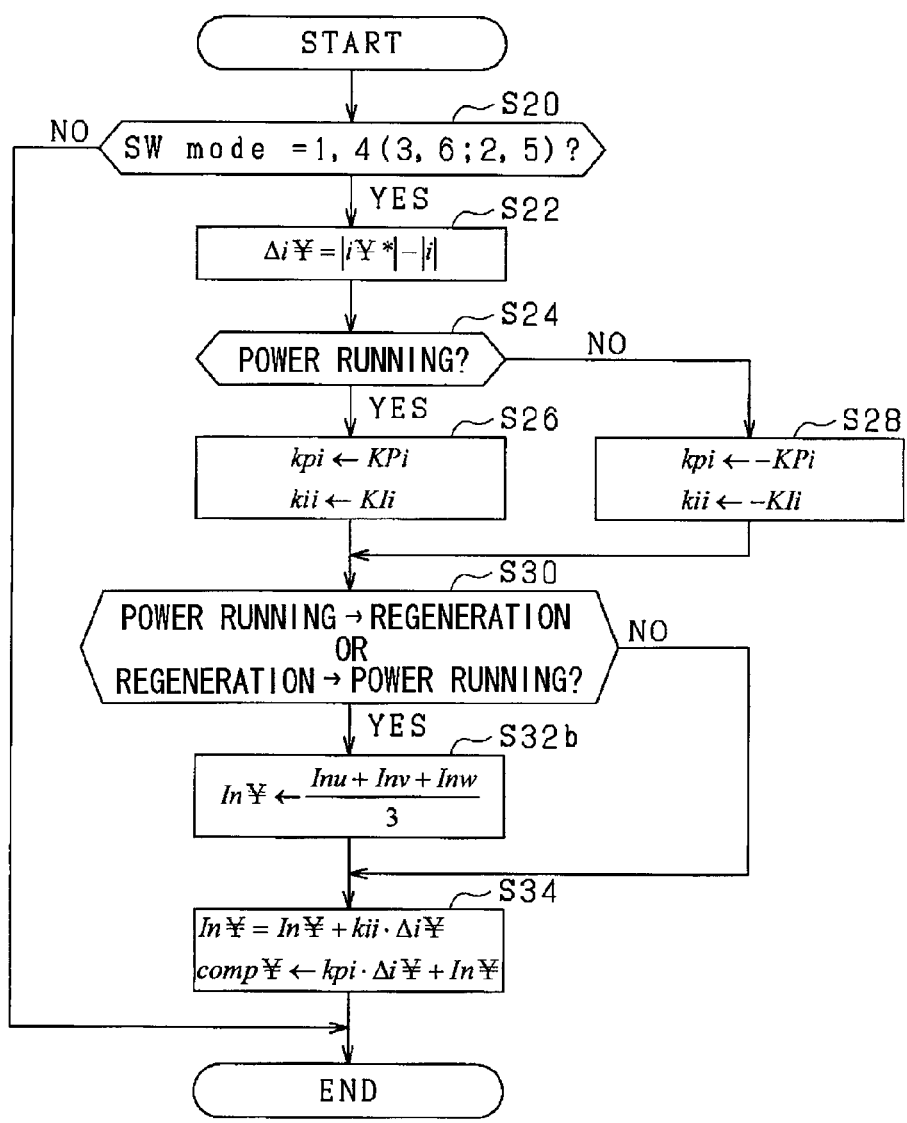
FIG. 12 is a flowchart showing an individual correcting process according to a seventh embodiment of the present disclosure.

A process performed by the individual feedback operation amount calculating portions 70, 72, 74 will be described with reference to FIG. 12. Each of the individual feedback operation amount calculating portions 70, 72, 74 repeats the process at a predetermined interval. In FIG. 12, a process corresponding to the process shown in FIG. 4 is denoted by the same numeral.

As shown in FIG. 12, in the present embodiment, at S32b, the output value In¥ of the integral element in the last control period is set to the average of the output values of the integral elements of the all phases in the last control period. The process at S32b is performed for initializing the difference (the difference corresponding amount) when the average of the output values of the integral elements of the all phases in the last control period is subtracted from the output values In¥ of the integral elements in the last control period. In the present embodiment, the process at S32b may be performed by an initializing section.

The process at S32b can reduce the time required for the output values In¥ to converge on the appropriate values at the switching time from one of the power-running control and the regeneration control to the other compared with a case in which the process at S32b is not performed.

Other Embodiments

Each of the above-described embodiments may be modified as follows.

[About Determining Section]

The determining section does not always have to make a determination on the basis of the current command value iq* of the q-axis and the electrical angular velocity ω. As an example, the determining section may make a determination on the basis of the torque command value Trq* and the electrical angular velocity ω.

The determining section does not always have to set the hysteresis between the condition for determining the switching time from the power-running control to the regeneration control and the condition for determining the switching time from the regeneration control to the power-running control.

[About Inversion Reflecting Section]

The inversion reflecting section does not always have to invert the output value In¥ of the integral element of each of the individual feedback operation amount calculating portions 70, 72, 74. As an example, the inversion reflecting section may set the output value In¥ of the integral element to a product of the inverted value and the gain (>0). As another example, the inversion reflecting section may set the output value In¥ of the integral element to a value obtained by inverting the polarity and fixing the absolute value to a predetermined value.

[About Common Correcting Section]

The common correcting section is not limited to the common correcting sections described in the first embodiment with reference to FIG. 1 and in the fifth embodiment with reference to FIG. 10. As an example, the common correcting section may uniformly correct the amplitudes of the all phases with an operation amount for feedback-controlling the average of the feedback operation amounts (amplitude feedback operation amounts) of any two phases, such as "(compu+compv)/2" to zero. In the present case, there is a possibility that the average of the all phases "(compu+compv+compw)/3" is not zero. However, the absolute value of the average of the all phases can be reduced compared with a case in which the present process is not performed.

In the second embodiment described with reference to FIG. 7, when the current command value id* of the d-axis is not zero, the voltage command value vd* of the d-axis may be a correction object.

In the processes shown in FIG. 5, the influence of switching between the power-running control and the regeneration control may be restricted, for example, by setting the time constant of the feedback control. In this case, the processes from S42 to S46 may be omitted.

[About Reducing Section]

When a model parameter for calculating terminal voltage command values (the voltage command values vd*, vq*) as the open-loop operating amounts is fixed, a section for correcting a calculated vector norm without being based on the feedback operation amounts of the electric currents is not limited to the reducing section that includes only a resistance changeable section described with reference to FIG. 11. For example, the reducing section may further include an inductance changeable section.

[About Average Calculating Section]

The average calculating section does not always have to calculate the average of the output values In¥ of the integral elements of the all phases as described in the fourth embodiment with reference to FIG. 9. As an example, the average calculating section may calculate the average of the last values of the individual correction amounts comp¥ of the all phases.

As another example, the average calculating section does not calculate the average of the all phases and calculates the average of the maximum value and the minimum value of the output values In¥ of the integral elements. In the present case, the calculated average is different from the average of the all phases. However, the difference corresponding amounts, which are the differences when the average is subtracted from the individual correction amounts comp¥, can be separated.

[About Difference Corresponding Amount Calculating Section]

In a case where the average calculating section calculates the average of the last values of the individual correction amounts comp¥ of the all phases, it is preferable that the difference corresponding amount calculating section subtracts the average from the last values of the individual correction amounts comp¥.

[About Separating Section]

As an example, on the basis of the values obtained by the three-phase conversion of the change amount of the voltage command value vq* of the q-axis by the average correction amount comp, the separating section may calculate an amount corresponding to the average in the process at S32a in FIG. 9.

[About Voltage Command Value Setting Section]

The voltage command value setting section does not always have to use the voltage equations. As an example, the voltage command value setting section may use a map. As another example, the voltage command value setting section may calculate the output voltage in a case where a control object is an induction device and a V/f control is performed.

[About Individual Correcting Section]

The individual correcting sections do not always have to include adding sections (i.e., the adding portions 76, 78, 80). As an example, the individual correcting sections may specifies a period in which the actual electric currents are close to zero on the basis of the electrical angle θ and the phases of the current command values id*, iq*, may calculate an operation amount for feedback-controlling the difference when the current command values are subtracted from the actual current i¥ to 1, and may transmit the operation amount to the adding portions 76, 78, 80.

The individual correcting section does not always have to calculate the feedback operation amount on the basis of the sum of the outputs of the proportional element and the integral element. As an example, the individual correcting section may calculate the feedback operation amount on the basis of the sum of the outputs of the proportional element, the integral element, and the differentiating element.

The individual correcting sections do not always have to receive the difference of the absolute values of the actual currents i¥ and the current command values i¥*. As an example, the individual correcting sections may determine the sign of the actual currents i¥ on the basis of the electrical angle θ and the phases of the current command values id*, iq* and may change the sign of the feedback gain on the basis of the sign of the actual currents i¥.

In a case where a section that detects electric currents flowing in the respective phases is provided, the individual correcting sections may calculate correction amounts for standardizing peak values of the respective electric currents, and may correct the voltage command value v¥* of each of the phases.

[About Feedback Operation Amount Based on History Information]

The feedback operation amounts are not limited to the output values In¥ of the integral elements. As an example, the feedback operation amounts may be output values of double integral elements.

[About Difference Corresponding Amount]

In a case where the individual correction section is configured so as to reduce variation in magnitude of the amplitudes on the basis of a relative magnitude comparison of the electric currents i¥ of the respective phases, the absolute value of the average of the feedback operation amounts may be reduced. Thus, in the present case, the feedback corresponding amounts may be treated as the difference corresponding amounts.

[About Zero Cross Timing Detecting Section]

A zero cross timing detecting section does not always have to use the output signals C¥ of the comparators 30, 32, 34. As an example, the zero cross timing detecting section may include a differential amplifier circuit that receives potential difference between both ends of the current path of the switching element S¥p and a comparing section that compares an output voltage of the differential amplifier circuit and the reference voltage. The comparing section may be provided by a software process performed by a central processing unit.

The zero cross timing detecting section does not always have to detect the polarity of the potential difference between both ends of the current path of the upper arm switching element S¥n, and the zero cross timing detecting section may detect the polarity of the potential difference of the current path of the lower arm switching element S¥n.

The zero cross timing detecting section may receive the bus current IDC. This can be achieved when the operation signal g¥# for simulating the voltage command value v¥* with the inverter INV is generated by a spatial vector modulation and a condition that switching modes corresponding to three adjacent effective voltage vectors are selected in one period is provided as a modulation condition. In the present case, because each period always include a period in which the absolute value of the bus current IDC is equal to the absolute value of the electric current of each phase, the zero cross timing detecting section may determine whether the polarity of the phase current is inverted between the adjacent periods on the basis of the bus current IDC. When the average voltage in one period is set to the voltage command values vd*, vq* using the three adjacent effective voltage vectors and the zero voltage vector, two of the three effective voltage vectors may be selected such that angle between the two effective voltage vectors and the voltage command values vd*, vd* are the smallest.

[About Phase Operating Section]

The phase operating section does not always have to calculate the sum of the outputs of the proportional element, the integral element, and the differentiating element as the phase correction amount Δθ. As an example, the phase operating section may set the sum of the outputs of the proportional element and the integral element as the phase correction amount Δθ.

The phase operating section does not always have to increase the target value Δθt of the deviation Δθ with increase in the electrical angular velocity ω. As an example, when earlier one of the zero cross timing of the actual current i¥ and the zero cross timing of the current command value i¥* is used as a trigger, and a rotation amount to the later one is counted with a hardware so as to reduce a delay, a similar effect can be achieved.

[About Dead Time]

The dead time correction amount does not always have to be calculated on the basis of the potential difference of the both ends of the current path of the switching element S¥#. As an example, the dead time correction amount may be calculated on the basis of the polarity of the current command value i¥*.

[About Electric Current to be Detection Object]

The electric current to be a detection object is not limited to the electric current that flows in the negative-electrode side input terminal. As an example, the electric current to be the detection object may be the electric current that flows into a positive-electrode side input terminal (i.e., the terminal coupled with the positive-electrode side direct-current bus line Lp).

As another example, a section that detects electric currents of two phase, such as the phase currents iu, iv, may be provided. In the present case, the identification section is unnecessary.

[About Phase Correction Process of Actual Current]

The phase correction process does not always have to feedback-control the zero cross timing of the actual current i¥ to the zero cross timing of the current command value i¥*. In a case where all information of the phase currents iu, iv, iw can be acquired in each PWM period, when the absolute value of the difference of the phase current i¥ with respect to the current command value i¥* treated with an advance correction is smaller in the all phases compared with the absolute value of the difference of the phase current i¥ with respect to the current command value i¥* synchronized with each of the phase currents i¥, the phase current amount Δθ may be used as a correction amount of a delay side. In the present case, when the absolute value of the difference of the phase current i¥ with respect to the current command value i¥* treated with a delay correction is smaller in the all phased compared with the absolute value of the difference of the phase current i¥ with respect to the current command value i¥* synchronized with each of the phase currents i¥, the phase correction amount Δθ may be used as a correction amount of an advance side. The current command value i¥* treated with the advance correction can be calculated by advancing parameters used in the conversion at the three-phase converting portion 50 with respect to the electrical angle θ.

When timings before and after changing at least one of a pair of modes corresponding to the effective voltage vectors in the switching modes used in one period of the PWM process are used, the information of the all phase currents iu, iv, iw does not have to be acquired in each PWM period. In the present case, information of the phase currents i¥ acquired at the timings before and after the changing of the modes can be used. Accordingly, it can be determined whether the absolute value of the difference of the phase current i¥ with respect to the current command value i¥ treated with the advance correction is small compared with the absolute value of the difference of the phase current i¥ with respect to the current command value i¥ synchronized with each of the phase currents i¥.

[About Operation of Phase of Output Voltage of Inverter INV]

The phase of the output voltage of the inverter INV does not always have to be operated directly on the basis of the phase difference of the actual current. As an example, as disclosed in JP-A-2008-278736, the phase of the output voltage of the inverter INV may be operated such that a zero cross timing of line current at a time when a switching mode is 0 or 7 corresponds to a zero cross timing of a change amount of the line current.

[About Alternating Voltage Applying Section]

The alternating-current voltage applying section is not limited to a direct-current to alternating-current converting circuit (e.g., the inverter INV) that includes a plurality switching elements coupling respective terminals of a rotating device with a positive-electrode or a negative-electrode of the alternating-current voltage source. As an example, as disclosed in JP-A-2008-30825, the alternating-current voltage applying section may be a converter that is coupled with terminals of a rotating device.

[About Rotating Device]

The synchronous machine is not limited to the SPMSM and may be an interior permanent magnet synchronous motor (IPMSM). The rotating device is not limited to the synchronous machine.

The rotating device does not always have to be mounted in the in-vehicle electric power steering. The control apparatus does not always have to control the torque of the rotating device. As an example, the control apparatus may control a rotation speed.

What is claimed is:

1. A control apparatus comprising an operating section and controlling a control amount of a rotating device that includes a plurality of terminals, the operating section operating an alternating-current voltage applying section that includes a plurality of output terminals and applies alternating-current voltage from the output terminals to the respective terminals of the rotating device, the operating section includes:

a voltage command value setting section receiving a command value of the control amount and setting terminal voltage command values that are command values of voltages of the respective output terminals of the alternating-current voltage applying section as open-loop operation amounts of the control amount;

a plurality of individual correcting sections calculating feedback operation amounts for reducing fluctuation in amplitude of electric currents flowing in the respective terminals of the rotating device on the basis of history information of the electric currents flowing in the respective terminals of the rotating device, the individual correcting sections correcting the terminal voltage command values with the feedback operation amounts;

a determining section determining whether it is a switching time from one of a power-running control and a regeneration control to the other of the power-running control and the regeneration control; and a prohibiting section prohibiting difference corresponding amounts from being reflected in correcting the terminal voltage command values with maintaining polarities of the difference corresponding amounts when the determining section determines that it is the switching time, the difference corresponding amounts corresponding to differences of the feedback operation amounts and an average of the feedback operation amounts.

2. The control apparatus according to claim 1, wherein the prohibiting section includes an inversion reflecting section that corrects the terminal voltage command values with correction amounts having polarities opposite from the polarities of the difference corresponding amounts when the determining section determines that it is the switching time.

3. The control apparatus according to claim 1, wherein
the voltage command value setting section receives a command value of electric current flowing in the rotating device as the command value of the control amount and sets the terminal voltage command values, and
the feedback operation amounts calculated by the individual correcting sections are used for feedback-controlling the electric currents flowing in the respective terminals of the rotating device to the command value of the electric current.

4. The control apparatus according to claim 3, wherein
the operating section further includes a separating section that separates the difference corresponding amounts from the feedback operation amounts calculated by the individual correcting sections.

5. The control apparatus according to claim 4, wherein
the separating section includes a reducing section that reduces an absolute value of the average.

6. The control apparatus according to claim 5, wherein
the reducing section includes a common correcting section that uniformly corrects amplitudes of the voltages of the respective output terminals of the alternating-current voltage applying section with an operation amount for feedback-controlling one of the feedback operation amounts or an average of several of the feedback operation amounts to zero.

7. The control apparatus according to claim 6, wherein
the voltage command value setting section sets the terminal voltage command values by inputting the command value of the electric current as the command value of the control amount to a voltage equation in which the electric current flowing in the rotating device is related to terminal voltages of the rotating device using a resistance, an inductance, and a reverse voltage constant of the rotating device, and
the common correcting section controls the resistance so as to feedback-control the average to zero.

8. The control apparatus according to claim 6, wherein
the voltage command value setting section includes a calculating section and a converting section,
the calculating section receives the command value of the electric current as the command value of the control amount and calculates voltage command values in a rotating two-dimensional coordinate system,
the converting section converts the voltage command values in the rotating two-dimensional coordinate system to the terminal voltage command values, and
the common correcting section controls the voltage command values in the rotating two-dimensional coordinate system so as to feedback-control the average to the command value.

9. The control apparatus according to claim 6, wherein
the voltage command value setting section includes a calculating section and a converting section,
the calculating section receives the command value of the electric current in a rotating two-dimensional coordinate system as the command value of the control amount and calculates voltage command values in the rotating two-dimensional coordinate system,
the converting section converts the voltage command values in the rotating two-dimensional coordinate system to the terminal voltage command values, and
the common correcting section controls the command value of the electric current in the rotating two-dimensional coordinate system so as to feedback-control the average to the command value.

10. The control apparatus according to claim 4, wherein
the separating section includes an average calculating section and a difference corresponding amount calculating section,
the average calculating section calculates an average of several of the feedback operation amounts calculated by the individual correcting sections, and
the difference corresponding amount calculating section calculates the difference corresponding amounts by subtracting the average from the respective feedback operation amounts when the determining section determines that it is the switching time.

11. The control apparatus according to claim 5, wherein
the voltage command value setting section sets the terminal voltage command values by inputting the command value of the electric current as the command value of the control amount to a voltage equation in which the electric current flowing in the rotating device is related to terminal voltages of the rotating device using a resistance and an inductance of the rotating device, and
the reducing section includes a resistance changeable section that is capable of changing the resistance in the voltage equation.

12. The control apparatus according to claim 1, wherein
the prohibiting section includes an initializing section that sets the difference corresponding amounts in the feedback operation amounts calculated by the individual correcting sections to zero when determining section determines that it is the switching time.

13. The control apparatus according to claim 1, wherein
the determining section sets a hysteresis between a condition for determining a switching time from the power-running control to the regeneration control and a condition for determining a switching time from the regeneration control to the power-running control.

14. The control apparatus according to claim 1, wherein
the individual correcting sections perform processes of calculating the feedback operation amounts based on the history information as outputs of integral elements.

15. The control apparatus according to claim 1, wherein
the alternating-current voltage applying section includes a direct-current to alternating-current converting circuit that includes a plurality of switching elements selectively coupling the terminals of the rotating device to a positive-electrode or a negative-electrode of a direct-current voltage source,
the operating section further includes an identification section,
the identification section receives a detection value of electric current flowing in a negative-electrode-side input terminal of the direct-current to alternating-current converting circuit or electric current flowing in a positive-electrode-side input terminal of the direct-current to alternating-current converting circuit, and
the identification section identifies which one of the terminals of the rotating device the electric current of which detection value is received flows in on the basis of a switching mode expressing an on-state or an off-state of each of the switching elements.

* * * * *